United States Patent

Rose et al.

Patent Number: 5,733,044
Date of Patent: Mar. 31, 1998

[54] TEMPERATURE SENSOR

[75] Inventors: Anita Rose, Hemmingen; Bernd Kuenzl, Schwieberdingen, both of Germany

[73] Assignee: Robert Bosch GmbH, Stuttgart, Germany

[21] Appl. No.: 659,041

[22] Filed: Jun. 3, 1996

[30] Foreign Application Priority Data

Sep. 20, 1995 [DE] Germany .................. 195 34 887.7

[51] Int. Cl.⁶ .................................................. G01K 1/08
[52] U.S. Cl. .................................... 374/144; 374/148
[58] Field of Search .............................. 374/138, 147, 374/148, 183, 185, 208

[56] References Cited

U.S. PATENT DOCUMENTS

| | | | |
|---|---|---|---|
| 3,230,772 | 1/1966 | Leslie et al. | 374/208 |
| 3,308,666 | 3/1967 | Anderson et al. | 374/148 |
| 4,179,309 | 12/1979 | Hance et al. | 374/208 |
| 4,622,851 | 11/1986 | Wilson | 374/208 |
| 4,688,949 | 8/1987 | Hatakenaka | 374/208 |
| 5,074,672 | 12/1991 | Emery et al. | 374/148 |
| 5,462,359 | 10/1995 | Reichl et al. | 374/148 |

FOREIGN PATENT DOCUMENTS

| | | | |
|---|---|---|---|
| 455769 | 2/1928 | Germany | 374/144 |
| 4237224 | 5/1994 | Germany . | |
| 1509626 | 9/1989 | U.S.S.R. | 374/144 |

*Primary Examiner*—G. Bradley Bennett
*Attorney, Agent, or Firm*—Edwin E. Greigg; Ronald E. Greigg

[57] ABSTRACT

In a temperature sensor for measuring and/or monitoring the temperature of a medium, in particular air, flowing in a flow conduit, in particular an intake tube, of an internal combustion engine, having a plastic body that can be plugged into a receiving bore and that carries a plastic plug with electrical connections and carries a plastic part, which has a resistor element and protrudes into the flow conduit, in order to reduce the manufacture and installation cost, at least one annular sealing bead, which produces the seal in relation to the inner wall of the receiving bore, and snap hooks are molded on the plastic body, which hooks engage behind radial shoulders embodies in the receiving bore.

17 Claims, 1 Drawing Sheet

5,733,044

TEMPERATURE SENSOR

BACKGROUND OF THE INVENTION

The invention is based upon a temperature sensor for measuring and/or monitoring the temperature of a fluid medium flowing in a flow conduit of an intake tube of an internal combustion engine.

In a temperature sensor of this kind (DE 42 37 224 Al), the sealing element is comprised of an O-ring disposed axially fixed in an annular groove set into the plastic body. The plastic body, which dips into the receiving bore of the wall of the flow conduit, is supported via an annular flange against the wall region that encompasses the outer end face of the receiving bore. The flange carries a radially protruding plastic lug that encloses a metallic sleeve. The flange is screwed through the sleeve and into the wall of the flow conduit and the O-ring sealingly presses against its inner wall so that the plastic body is fixed in the receiving bore.

OBJECT AND SUMMARY OF THE INVENTION

The temperature sensor according to the invention has the advantage over the prior art that it is comprised of only one single part that can be installed rapidly and without an auxiliary tool. The temperature sensor according to the invention is easily slid into the receiving bore with little expenditure of force. With that, the installation is already finished. The sealing bead assures the tightness between the plastic body and the receiving bore so that a separate O-ring is no longer necessary. Except for the electrical parts, the temperature sensor is made of one piece, completely out of plastic, which makes manufacturing less expensive.

Advantageous improvements and updates of the temperature sensor disclosed herein are possible by means of the measures set forth hereinafter.

According to a preferred embodiment of the invention, the fastening means are embodied in the form of snap hooks that are molded onto the plastic body and engage behind radial shoulders in the receiving bore. As a result, an installation friendly which freely and reliable secures the temperature sensor in the receiving bore is achieved. The temperature sensor is now pressed into the receiving bore until the snap hooks engage. Additional screws for fastening the plastic body to the wall of the flow conduit and their laborious screwing in are no longer necessary. The temperature sensor can be removed with no trouble by disengaging the snap hooks.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
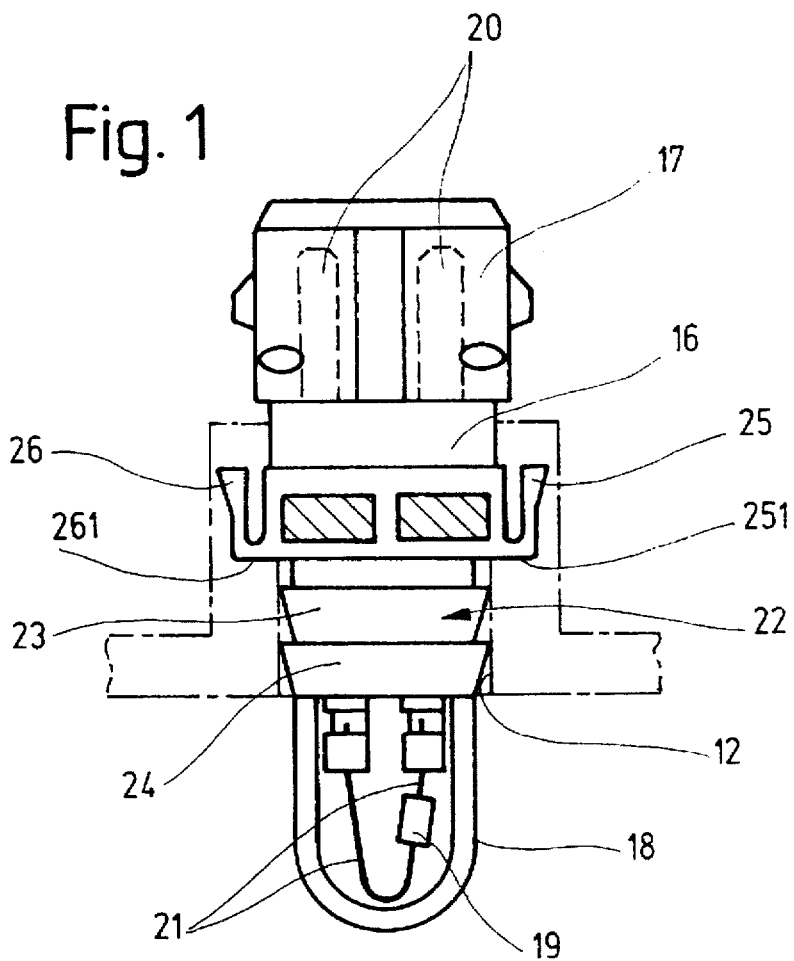
FIG. 1 shows a side view of a temperature sensor for an intake tube of an internal combustion engine.
Figure 2:
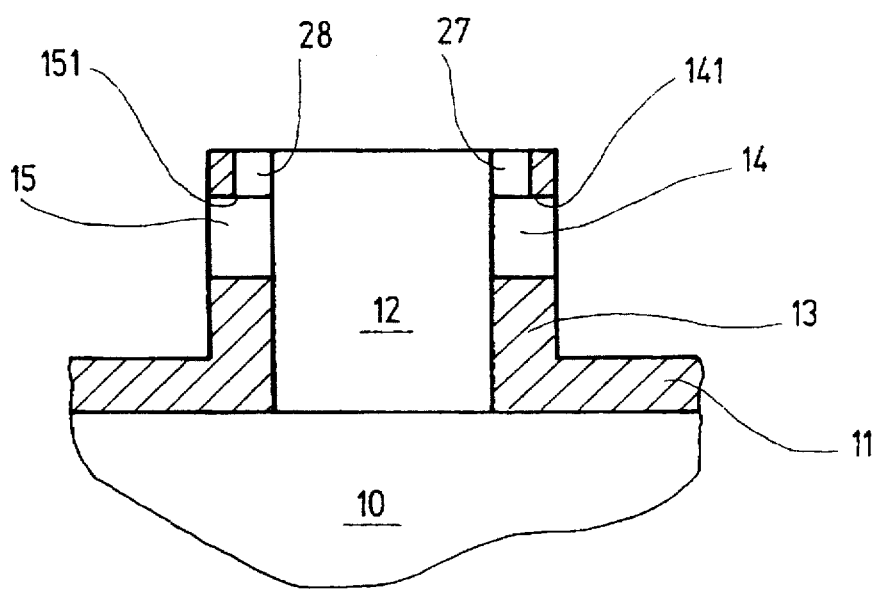
FIG. 2 shows a detail of a longitudinal section through an intake tube with a receiving bore for the temperature sensor.

The temperature sensor shown in a front view in FIG. 1 is used to measure and/or monitor the temperature of the air in the intake tube of an internal combustion engine and can furthermore be used for generally measuring the temperature of a fluid medium flowing in a flow conduit. FIG. 2 shows a detail of a longitudinal section through the intake conduit 10 with its wall 11. A receiving bore 12 is provided in the wall 11 to receive the temperature sensor and continues on in a receiving fitting 13 that is of one piece with the wall 11 and protrudes outward at right angles from the wall 11. Two radial through holes 14, 15 are formed into the receiving fitting 13, whose hole axes are axially aligned with each other.

The temperature sensor has a plastic body 16 that, on its one face end, transitions into a plastic plug 17 and on its other face end, carries a plastic part that is embodied for example as a plastic U-shaped stirrup piece 18 and covers a resistor element such as a NTC resistor 19, in a U-shape. Two electrical connections in the form of plug pins 20 are disposed in the plastic plug 17 and are connected to the NTC resistor 19 via electrical lines 21. The plug pins 20 are accessible from the end face of the plastic plug 17. After the temperature sensor is plugged into the receiving bore 12, the plastic body 16 is nearly completely enclosed by the receiving fitting 13, while the plastic plug 17 is disposed outside the receiving fitting 13 and the plastic stirrup piece 18 protrudes completely into the intake conduit 10. The flow direction of the air in the intake conduit is perpendicular to the plane of the drawing in FIG. 1. The receiving fitting 13 with receiving bore 12 and wall 11 of the intake conduit 10, in association with the temperature sensor plugged into it, is indicated in FIG. 1 with a dot-and-dash line.

To seal the plastic body 16 in relation to the inner wall of the receiving bore 12, a sealing element 22 is disposed on the plastic body 16, which element is comprised of two sealing beads 23, 24 disposed one directly behind the other in the plug-in direction of the plastic body 16, which beads are molded in one piece onto the plastic body 16. Each sealing bead 23, 24 is conically embodied, wherein it tapers in the plug-in direction of the plastic body 16.

To fix the plastic body 16 in the receiving bore 12, two diametrically disposed snap hooks 25, 26 are molded in one piece on the plastic body 16. These snap hooks 25, 26 are embodied so that after the plastic body 16 is slid into the receiving bore 12, the snap hooks snap into the two through holes 14, 15 and each engages behind one of the radial shoulders 141 or 151 (FIG. 2) that are formed by the upper hole walls, which face backward in the plug-in direction. Two axial plug-in grooves 27, 28 (FIG. 2) are cut diametrically into the receiving bore 12 for the plugging-in of the snap hooks 25, 26 and extend from the end face of the receiving fitting 13 to the through holes 14, 15 and come out unblocked at the end face and in the through holes 14, 15. The axial height of the through holes 14, 15 is embodied so that the end faces 251, 281 of the snap hooks 25, 26, which end faces point in the plug-in direction, are stopped at the lower hole walls of the through holes 14, 15, which walls are disposed opposite the plug-in grooves 27, 28 in the axial direction, when the snap hooks 25, 26 cover the radial shoulders 141, 151. As a result, the temperature sensor is axially and radially positioned inside the receiving bore 12 with only slight axial play. To remove the temperature sensor, that is, to withdraw it from the receiving bore 12 once again, the snap hooks 25, 26 must be pressed inward by means of an auxiliary tool until they clear the radial shoulders 141, 151 once more.

In an alternative embodiment, the radial shoulders 141, 151 can also be realized by means of simple recesses in the inner wall of the receiving bore 12. Naturally, more than two snap hooks can also be provided, which are preferably embodied on the plastic body 16 offset from one another by an equal circumferential angle. Then, a corresponding number of through holes must be provided in the receiving fitting 13, which correspond to the snap hooks.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A temperature sensor for measuring and monitoring the temperature of a fluid medium flowing in a flow conduit of an intake tube (10), of an internal combustion engine, which comprises a plastic body (16) that can be plugged into a receiving bore (12) in a wall (11) of the flow conduit, said plastic body has a plastic plug (17) on one end with electrical connections (20), said plastic plug can be accessed from outside the flow conduit, said plastic plug has a plastic part (18) that protrudes into the flow conduit, said plastic part covers a resistor element (19) that is connected to the electrical connections (20), a sealing element (22) is disposed on the plastic body (16) and sealingly presses against an inner wall of the receiving bore (12), said plastic body includes fastening means for fixing the plastic body (16) in the receiving bore (12), and the sealing element (22) has at least one annular sealing bead (23, 24) molded onto the plastic body (16).

2. A temperature sensor according to claim 1, in which the fastening means are embodied in the form of oppositely disposed snap hooks (25, 26) molded onto the plastic body (16), which engage behind radial shoulders (141, 151) embodied in the receiving bore (12).

3. A temperature sensor according to claim 1, in which said at least one annular sealing bead (23, 24) is embodied as conical and tapers as viewed in the plug-in direction of the plastic body (16).

4. A temperature sensor according to claim 2, in which said at least one annular sealing bead (23, 24) is embodied as conical and tapers as viewed in the plug-in direction of the plastic body (16).

5. A temperature sensor according to claim 1, in which said at least one annular sealing bead includes two sealing beads (23, 24) which are disposed one directly behind the other in the plug-in direction of the plastic body (16).

6. A temperature sensor according to claim 2, in which said at least one annular sealing bead includes two sealing beads (23, 24) which are disposed one directly behind the other in the plug-in direction of the plastic body (16).

7. A temperature sensor according to claim 3, in which said at least one annular sealing bead includes two sealing beads (23, 24) which are disposed one directly behind the other in the plug-in direction of the plastic body (16).

8. A temperature sensor according to claim 4, in which said at least one annular sealing bead includes two sealing beads (23, 24) which are disposed one directly behind the other in the plug-in direction of the plastic body (16).

9. A temperature sensor as set forth in claim 1, in which said plastic part that protrudes into the flow conduit is U-shaped and open to fluid flow.

10. A temperature sensor as set forth in claim 2, in which said plastic part that protrudes into the flow conduit is U-shaped and open to fluid flow.

11. A temperature sensor as set forth in claim 3, in which said plastic part that protrudes into the flow conduit is U-shaped and open to fluid flow.

12. A temperature sensor as set forth in claim 5, in which said plastic part that protrudes into the flow conduit is U-shaped and open to fluid flow.

13. A temperature sensor as set forth in claim 1, in which said resistor element is a variable NTC resistor.

14. A temperature sensor as set forth in claim 2, in which said resistor element is a variable NTC resistor.

15. A temperature sensor as set forth in claim 3, in which said resistor element is a variable NTC resistor.

16. A temperature sensor as set forth in claim 5, in which said resistor element is a variable NTC resistor.

17. A temperature sensor as set forth in claim 9, in which said resistor element is a variable NTC resistor.

* * * * *